US008947579B2

(12) United States Patent
Terashima et al.

(10) Patent No.: US 8,947,579 B2
(45) Date of Patent: Feb. 3, 2015

(54) IMAGING APPARATUS, IMAGING SYSTEM, AND IMAGING APPARATUS CONTROL METHOD AND PROGRAM FOR SETTING A RANGE OF LENS POSITIONS

(75) Inventors: Yoshito Terashima, Tokyo (JP); Hisashi Ishiwata, Tokyo (JP)

(73) Assignee: Sony Corporation, Tokyo (JP)

( * ) Notice: Subject to any disclaimer, the term of this patent is extended or adjusted under 35 U.S.C. 154(b) by 874 days.

(21) Appl. No.: 13/078,414

(22) Filed: Apr. 1, 2011

(65) Prior Publication Data

US 2011/0292272 A1 Dec. 1, 2011

(30) Foreign Application Priority Data

May 28, 2010 (JP) ................. 2010-122167

(51) Int. Cl.
*H04N 5/232* (2006.01)
*G02B 7/10* (2006.01)
*G03B 13/36* (2006.01)

(52) U.S. Cl.
CPC ............... *G02B 7/102* (2013.01); *G03B 13/36* (2013.01); *H04N 5/23212* (2013.01)
USPC ....................................... 348/345

(58) Field of Classification Search
USPC ......... 348/345, 346, 348, 352, 353, 354, 360; 382/255
See application file for complete search history.

(56) References Cited

U.S. PATENT DOCUMENTS

| 2007/0116382 A1* | 5/2007 | Gotanda ................. 382/293 |
| 2009/0115883 A1* | 5/2009 | Tsuchiya ................. 348/345 |
| 2010/0085470 A1* | 4/2010 | Tsubusaki ................. 348/345 |
| 2010/0232775 A1* | 9/2010 | Okamoto et al. ................ 396/81 |

FOREIGN PATENT DOCUMENTS

| JP | 2002182302 A * | 6/2002 | ............. G03B 19/02 |
| JP | 2010-8695 | 1/2010 | |

OTHER PUBLICATIONS

U.S. Appl. No. 13/076,975, filed Mar. 31, 2011, Terashima.

* cited by examiner

*Primary Examiner* — Mekonnen Dagnew
(74) *Attorney, Agent, or Firm* — Sony Corporation

(57) ABSTRACT

In an imaging apparatus, an imager generates an imaged picture by converting incident light from a subject that is incident via a focus lens. A setting unit sets, as a movement range for the focus lens, a range of focus lens positions corresponding to imaging magnifications where the rate of change in the imaging magnification lies within a fixed range from a basis, the basis being an imaging magnification corresponding to the position of the focus lens. A focus controller configured to conduct focus control with respect to the subject by moving the focus lens in the set movement range.

10 Claims, 10 Drawing Sheets

IMAGING APPARATUS, IMAGING SYSTEM, AND IMAGING APPARATUS CONTROL METHOD AND PROGRAM FOR SETTING A RANGE OF LENS POSITIONS

BACKGROUND OF THE INVENTION

1. Field of the Invention

The present invention relates to an imaging apparatus, and more particularly, to an imaging apparatus and imaging system provided with autofocus functions, a method for controlling the same, and a program that causes a computer to execute the method.

2. Description of the Related Art

Recently, imaging apparatus such as digital still cameras and digital video cameras (camcorders, for example) are becoming popular. Such imaging apparatus image a person, animal, or other subject to generate picture data (an imaged picture), and record this picture data as picture content. There also exist imaging apparatus that display an imaged picture generated by an imaging element on a display unit as a live preview picture while in an imaging standby state in the case of shooting a still picture, for example. By displaying a live preview picture in this way, the user is able to easily confirm his or her desired angle of view and composition before shooting.

Also, imaging apparatus provided with autofocus functions that automatically focus a subject are becoming widely popular. A contrast-detecting autofocus function (referred to as contrast AF (Auto Focus)) exists as one example of such autofocus functions.

With contrast AF, high-frequency components in the spatial frequency of a picture are extracted in a specific region (AF region) of an imaged picture, and focus control is conducted by moving a focus lens to a position that maximizes a luminous intensity difference in the extracted high-frequency components. Also, with contrast AF, a given focus lens movement range is set, and by moving a focus lens within this range, subjects are successively acquired and focus control is conducted.

Herein, in the case where focus control is conducted on a moving subject, a focus lens movement range should be set according to the subject's movement in order to acquire the moving subject. For example, there have been proposed imaging apparatus that set a focus lens movement range for a moving subject while predicting that subject's movement velocity.

For example, there has been proposed an imaging apparatus that sets a subsequent focus lens movement range on the basis of respective rating values calculated at a plurality of positions given by movement of a focus lens within a given range in a first period and the rating value variation (see Japanese Unexamined Patent Application Publication No. 2010-8695, FIG. 11, for example). This imaging apparatus calculates respective rating values computed during a first period, and a rating value (second rating value) at one of a plurality of positions within a given range during a period (second period) lasting until a focus position based on those respective rating values is computed. Then, the imaging apparatus calculates the rating value variation on the basis of the second rating value and a rating value (computed in the first period) corresponding to the position of the second rating value, and sets the next focus lens movement range on the basis of a focus position based on the respective rating values in the first period and the rating value variation.

SUMMARY OF THE INVENTION

According to the related art described above, device response speed can be improved since the interval between AF operations can be shortened.

At this point, consider the case where an imaged picture generated by an imaging element is displayed on a display unit as a live preview picture while in an imaging standby state for still pictures, for example. In this case, a focus lens should still be moved within a given focus lens movement range as described above when conducting focus control. In the case of moving a focus lens in this way, the imaging magnification is changed according to the focus lens movement, and thus the live preview picture displayed on the display unit is enlarged or reduced. In the case where the enlargement or reduction of a live preview picture displayed on the display unit is slight, for example, the effects on the live preview are minute. However, in the case where the rate of change in the imaging magnification is comparatively large, the enlargement or reduction of a live preview picture becomes great, and may make a live preview picture more difficult to see when the user confirms a subject.

In light of such circumstances, it is desirable to conduct suitable focus control while maintaining visibility during imaging operations.

In light of the above problems, embodiments of the present invention provide an imaging apparatus, a control method therefor, and a program causing a computer to execute the method. The imaging apparatus includes an imager configured to generate an imaged picture by converting incident light from a subject that is incident via a focus lens; a setting unit configured to set, as a movement range for the focus lens, a range of focus lens positions corresponding to imaging magnifications where the rate of change in the imaging magnification lies within a fixed range from a basis, the basis being an imaging magnification corresponding to the position of the focus lens; and a focus controller configured to conduct focus control with respect to the subject by moving the focus lens in the set movement range. In so doing, an embodiment of the present invention operates to set a focus lens movement range on the basis of an imaging magnification corresponding to the position of the focus lens, and conduct focus control by moving the focus lens in the set movement range.

The setting unit may also calculate a movement range for the focus lens on the basis of the focal depth corresponding to the focus lens position according to the basis, select the narrower range from between the movement range based on focal depth and the movement range based on imaging magnification, and set the selected movement range as the focus lens movement range. In so doing, an embodiment of present invention operates to calculate a focus lens movement range on the basis of the focal depth corresponding to the position of the focus lens, select the narrower movement range from between the movement range based on focal depth and the movement range based on imaging magnification, and set the selected movement range as the focus lens movement range.

The setting unit may also set, as the movement range, a range specified by two positions from among the focus lens positions corresponding to imaging magnifications where the rate of change lies within a fixed range, one position being the position lying farthest distance away at close-up from the focus lens position according to the basis, and one position being the position lying the farthest distance away at infinity. In so doing, an embodiment of the present invention operates to set, as a focus lens movement range, a range specified by two positions from among the focus lens positions corresponding to imaging magnifications where the rate of change lies within a fixed range, one position being the position lying farthest distance away at close-up from the focus lens position according to the basis, and one position being the position lying the farthest distance away at infinity.

The setting unit may also newly set a range favorable for focus control conducted by the focus controller as the focus lens movement range in the case where the set movement range does not satisfy the range favorable for focus control. In so doing, an embodiment of the present invention operates to newly set a range favorable for focus control conducted by the focus controller as the focus lens movement range in the case where the set movement range does not satisfy the range favorable for focus control.

The imaging apparatus may additionally include a calculating unit configured to calculate a movement velocity of the subject with respect to the optical axis, and the setting unit may set a movement range based on imaging magnification only in the case where the calculated movement velocity is small relative to a fixed value. In so doing, an embodiment of the present invention operates to calculate a movement velocity of the subject with respect to the optical axis, and set a movement range based on imaging magnification only in the case where the calculated movement velocity is small relative to a fixed value.

The imaging apparatus may additionally include a communication unit configured to communicate with an interchangeable lens that stores imaging magnifications corresponding to respective states of a plurality of optical members for each state of the plurality of optical members, and the setting unit may acquire imaging magnifications used when setting the movement range from the interchangeable lens. In so doing, an embodiment of the present invention operates to acquire imaging magnifications used when setting the movement range from an interchangeable lens.

The imaging apparatus may additionally include a display controller configured to successively display the generated imaged picture on a display unit, and the setting unit may set the movement range based on imaging magnification only in the case where the generated imaged picture is being displayed on the display unit when a continuous AF mode is set. In so doing, an embodiment of the present invention operates to set a movement range based on imaging magnification only in the case where a generated imaged picture is being displayed on a display unit when a continuous AF mode is set.

Other embodiments of the present invention provide an imaging system, a control method therefor, and a program causing a computer to execute the method. The imaging system includes an interchangeable lens and an imaging apparatus. The interchangeable lens is provided with a plurality of optical members, a first communication unit configured to communicate with the imaging apparatus, and a storage unit configured to store imaging magnifications corresponding to respective states of the plurality of optical members for each state of the plurality of optical members. The imaging apparatus is provided with a second communication unit configured to communicate with the interchangeable lens, an imager configured to generate an imaged picture by converting incident light from a subject that is incident via a focus lens, a setting unit configured to acquire an imaging magnification in accordance with the position of the focus lens from the storage unit, take the imaging magnification corresponding to the position of the focus lens as a basis, and set, as a movement range for the focus lens, a range of focus lens positions corresponding to imaging magnifications where the rate of change in the imaging magnification from the basis lies within a fixed range, and a focus controller configured to conduct focus control with respect to the subject by moving the focus lens in the set movement range. In so doing, an embodiment of the present invention operates to set a focus lens movement range on the basis of an imaging magnification acquired from an interchangeable lens and corresponding to the position of a focus lens, and conduct focus control by moving the focus lens in the set movement range.

According to an embodiment of the present invention, excellent advantages are achieved whereby suitable focus control can be conducted while maintaining visibility during imaging operations.

DESCRIPTION OF THE PREFERRED EMBODIMENTS

Hereinafter, embodiments of the present invention will be described. The description will proceed in the following order.

1. First Embodiment (focus control: example of setting a focus lens movement range on the basis of imaging magnification when fixed conditions are satisfied in an imaging system)

2. Second Embodiment (focus control: example of setting a focus lens movement range on the basis of imaging magnification when fixed conditions are satisfied in an imaging apparatus)

1. First Embodiment

[Exemplary Internal Configuration of Imaging System]

Figure 1:
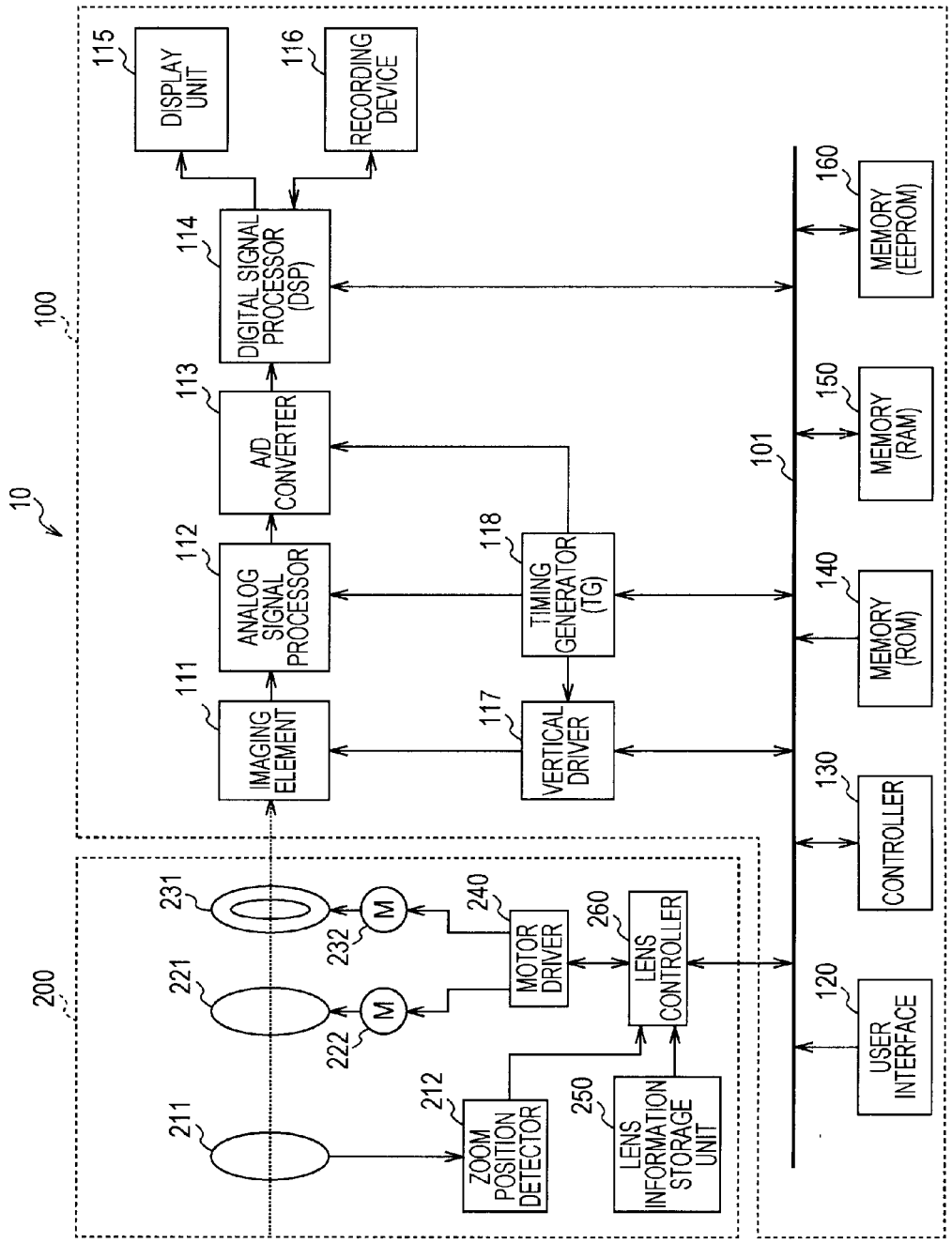
FIG. 1 is a block diagram illustrating an exemplary internal configuration of an imaging system in accordance with a first embodiment of the present invention.

FIG. 1 is a block diagram illustrating an exemplary internal configuration of an imaging system 10 in accordance with a first embodiment of the present invention. The imaging system 10 is provided with an imaging apparatus 100 and an interchangeable lens 200. The imaging system 10 is realized by, for example, a digital still camera in which the lens can be interchanged (a digital single-lens camera, for example).

The imaging apparatus 100 images a subject and generates picture data (an imaged picture), and records generated picture data as picture content (still picture content or motion picture content). Also, an interchangeable lens 200 may be attached to the imaging apparatus 100 via a lens mount (not illustrated).

The interchangeable lens 200 is an interchangeable lens unit attached to the imaging apparatus 100 via a lens mount (not illustrated). The interchangeable lens 200 is provided with a zoom lens 211, a zoom position detector 212, a focus lens 221, a focus lens drive motor 222, an aperture 231, and an aperture drive motor 232. The interchangeable lens 200 is also provided with a motor driver 240, a lens information storage unit 250, and a lens controller 260.

The zoom lens 211 adjusts the focal length by moving along the optical axis due to either electrical or manual driving. In other words, the zoom lens 211 is driven forward and backward with respect to a subject in order to enlarge or reduce the subject included in an imaged picture. Also, zoom functions are realized by the zoom lens 211. Herein, a first embodiment of the present invention illustrates an example of driving the zoom lens 211 by manual operations performed by the user.

The zoom position detector 212 detects the position of the zoom lens 211 driven by zoom operations performed by the user, and outputs a detection result to the lens controller 260.

The focus lens 221 adjusts focus by moving along the optical axis due to driving by the focus lens drive motor 222. In other words, the focus lens 221 is used in order to focus a desired target object included in the subject. Also, autofocus functions are realized by the focus lens 221.

The focus lens drive motor 222 moves the focus lens 221 on the basis of control by the motor driver 240.

The aperture 231 adjusts the amount of incident light passing through the zoom lens 211 and the focus lens 221, and supplies the adjusted light to an imaging element 111. The aperture 231 is driven by the aperture drive motor 232, and its aperture stop is regulated.

The aperture drive motor 232 drives the aperture 231 on the basis of control by the motor driver 240.

A zoom lens 211 and a focus lens 221 constituting a interchangeable lens 200 in this way are a lens group that focuses incident light from a subject. Light focused by the lens group is incident upon the imaging element 111 via the aperture 231.

The motor driver 240 drives the focus lens drive motor 222 and the aperture drive motor 232 on the basis of control by the lens controller 260.

The lens information storage unit 250 is memory that stores characteristic information related to the respective optical members (focus lens 221, aperture 231, etc.) constituting the interchangeable lens 200 (lens information), and supplies stored information to the lens controller 260. This characteristic information is optical member information related to optical members (lens information), which includes the position of the focus lens 221 (focused subject position), the focal length, the aperture value (f-number), and the imaging magnification, for example. Herein, imaging magnification means the ratio of the size of a figure formed by light incident via lenses versus the actual size of a subject. Herein, the imaging magnification varies according to factors such as the focal length f, the aperture, and the position of the focus lens 221. Also, imaging magnification properties often vary greatly by lens type. For this reason, imaging magnifications according to states of the respective optical members (the position of the focus lens 221, etc.) are associated with the respective states, and stored in the lens information storage unit 250 as characteristic information. In other words, the lens information storage unit 250 stores imaging magnifications according to respective states of a plurality of optical members for each state of the plurality of optical members. Herein, the lens information storage unit 250 is an example of a storage unit.

The lens controller 260 communicates various information with the imaging apparatus 100, and controls the respective units constituting the interchangeable lens 200 (focus lens 221, aperture 231, etc.) on the basis of the communication results. In other words, the lens controller 260 controls the respective units constituting the interchangeable lens 200 on the basis of control signals from a controller 130 of the imaging apparatus 100. Also, the lens controller 260 transmits lens information stored in the lens information storage unit 250 to the controller 130 in response to a transmission request from the controller 130 of the imaging apparatus 100. A communication process between the imaging apparatus 100 and the interchangeable lens 200 is conducted by synchronous communication, for example. Herein, the lens controller 260 is an example of a first communication unit.

The imaging apparatus 100 is provided with a system bus 101, an imaging element 111, an analog signal processor 112, and an analog/digital (A/D) converter 113. The imaging apparatus 100 is also provided with a digital signal processor (hereinafter abbreviated DSP) 114, a display unit 115, and a recording device 116. The imaging apparatus 100 is also provided with a vertical driver 117, a timing generator (hereinafter abbreviated TG) 118, a user interface 120, and a controller 130. The imaging apparatus 100 is also provided with memory (read-only memory (ROM)) 140 and memory (random access memory (RAM)) 150. The imaging apparatus 100 is also provided with memory (electrically erasable and programmable read-only memory (EEPROM)) 160. Herein, the DSP 114, vertical driver 117, TG 118, user interface 120, controller 130, memory (ROM) 140, memory (RAM) 150, and memory (EEPROM) 160 are coupled in a mutually communicable manner via the system bus 101.

The imaging element 111 is a photoelectric conversion element that receives light supplied via the zoom lens 211, the focus lens 221, and the aperture 231 (incident light), and converts the incident light into an electrical signal. The imaging element 111 then supplies the converted electrical signal (analog signal) to the analog signal processor 112. Also, the imaging element 111 is driven by the vertical driver 117. Herein, a charge-coupled device (CCD) sensor, a complementary metal oxide semiconductor (CMOS) sensor, or similar element may be used as the imaging element 111, for example.

Driven by the TG 118, the analog signal processor 112 performs analog processing such as noise removal on an electrical signal (analog signal) supplied from the imaging element 111, and supplies the analog-processed analog signal to the A/D converter 113.

Driven by the TG 118, the A/D converter 113 converts an analog signal supplied from the analog signal processor 112 into a digital signal, and supplies the converted digital signal to the DSP 114.

On the basis of control by the controller 130, the DSP 114 conducts image processing such as black level correction, white balance adjustment, and gamma correction on a digital signal supplied from the A/D converter 113. Then, the DSP 114 supplies the image-processed picture data to the display unit 115, the recording device 116, and the controller 130. For example, the DSP 114 may perform compression processing on the image-processed picture data, and supply the picture data subjected to compression processing (compressed picture data) to the recording device 116. Also, the DSP 114 may perform decompression processing on compressed picture data recorded onto the recording device 116, and supply the decompressed picture data to the display unit 115. Herein, the Joint Photographic Experts Group (JPEG) format may be implemented as the compression format, for example. Also, picture data supplied from the DSP 114 is used by the controller 130 to conduct respective controls.

The display unit 115 is a display apparatus that displays picture data supplied from the DSP 114. For example, while in an imaging standby state when a still picture imaging mode is set, the display unit 115 displays picture data that has been image-processed by the DSP 114 as an imaged picture (what is called a live preview picture). The display unit 115 is also able to display picture data recorded onto the recording device 116 as a list image, and play back that picture data, for example. A display panel such as an organic electro-luminescence (EL) panel or a liquid crystal display (LCD) may be used as the display unit 115, for example.

The recording device 116 records picture data that has been image-processed by the DSP 114. The recording device 116 also supplies recorded picture data to the DSP 114. Herein, the recording device 116 may be configured to be built into the imaging apparatus 100 or freely removable from the imaging apparatus 100. Also, various recording media such as semiconductor memory, an optical recording medium, a magnetic disk, or a hard disk drive (HDD) may be used as the recording device 116. Herein, a disc such as a recordable Digital Versatile Disc (DVD), a recordable Compact Disc (CD), or a Blu-ray Disc (registered trademark) may be used as an optical recording medium, for example.

The vertical driver 117 drives the imaging element 111 on the basis of control by the controller 130.

The TG 118 generates drive control signals for the vertical driver 117, the analog signal processor 112, and the A/D converter 113 on the basis of a reference clock supplied from the controller 130.

The user interface 120 is provided with buttons, switches, and other user-operable members for conducting various operations. The user interface 120 accepts operation input from the user, and outputs the content of accepted operation input to the controller 130 via the system bus 101. Herein, besides user-operable members such as buttons disposed on the exterior of the imaging apparatus 100, a touch panel may be provided on top of the display unit 115, and operation input from the user may be accepted on the touch panel.

The controller 130 is a central processing apparatus that controls respective components of the imaging apparatus 100 on the basis of respective information stored in the memory (ROM) 140, etc. The controller 130 also conducts communication control with the interchangeable lens 200, sending and receiving various information. The controller 130 controls settings such as the exposure, white balance, focus, and flash emission (from a flash emitter 102 illustrated in FIG. 2), for example. Also, when imaging, the controller 130 generates control signals on the basis of user operation input from the user interface 120 and picture data from the DSP 114, for example. The controller 130 then controls settings such as the exposure, white balance, focus, and flash by outputting generated control signals to the motor driver 240, the vertical driver 117, the TG 118, the interchangeable lens 200, etc., and causing the focus lens 221, aperture 231, etc. to operate. The controller 130 also issues transmission requests for information used in respective processes to the interchangeable lens 200.

Also, in the case of recording picture data that has been image-processed by the DSP 114, the controller 130 outputs control signals to the DSP 114 on the basis of user operation input from the user interface 120. The controller 130 then causes picture data that has been compressed by the DSP 114 to be recorded onto the recording device 116 as a still picture file. In the case of displaying a still picture file recorded onto the recording device 116, the controller 130 outputs control signals to the DSP 114 on the basis of user operation input from the user interface 120. The controller 130 then causes a picture corresponding to a still picture file recorded onto the recording device 116 to be displayed by the display unit 115.

The controller 130 also conducts focus control using a subject contrast signal acquired from a picture signal generated by the imaging element 111, etc. (what is called contrast AF). Continuous AF is one type of such contrast AF. Continuous AF is an autofocus function that continuously focuses a subject in motion. In other words, in the case where a continuous AF mode is set, subject tracking and subject velocity prediction are conducted while the user lightly presses a shutter button 121 (illustrated in FIG. 2), and an imaging process is executed immediately after the user firmly presses the shutter button 121. Thus, a photograph (imaged picture) can be recorded wherein a subject exists with the angle of view and composition intended by the user, and also wherein the subject is in focus. According to this continuous AF, optimal focus control can be conducted for a moving subject. Herein, the controller 130 is realized by a central processing unit (CPU), for example. A functional configuration of the controller 130 will also be described in detail with reference to FIG. 3.

The memory (ROM) 140 is non-volatile memory that stores various programs and various data for the controller 130 to execute respective processes.

The memory (RAM) 150 is volatile memory that stores data that should be temporarily stored and rewritable data while the controller 130 operates, and is for example used as work memory while the controller 130 operates.

The memory (EEPROM) 160 stores data even when the imaging apparatus 100 is powered off, and various configuration parameters, etc. are recorded thereon.

[Exemplary Exterior Configuration of Imaging System]

Figure 2A:
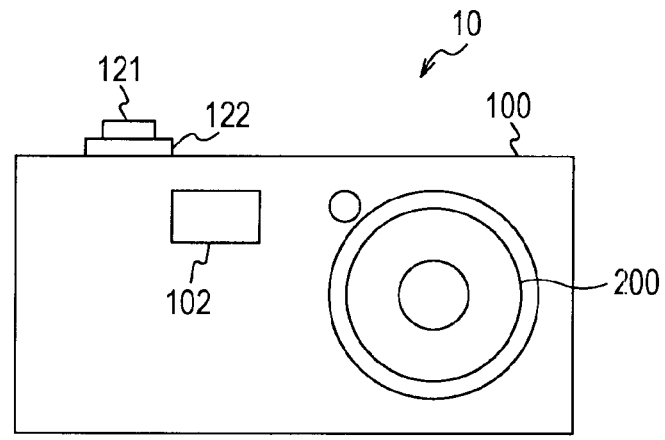
FIGS. 2A to 2C illustrate an exemplary exterior configuration of an imaging system in accordance with a first embodiment of the present invention.
Figure 2B:
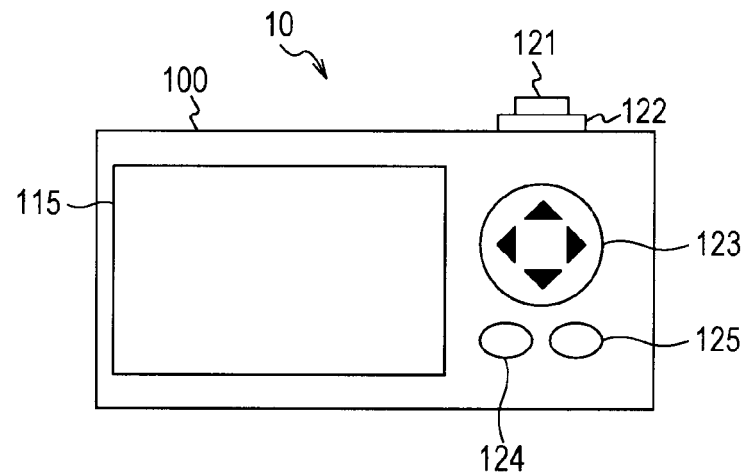
Figure 2C:
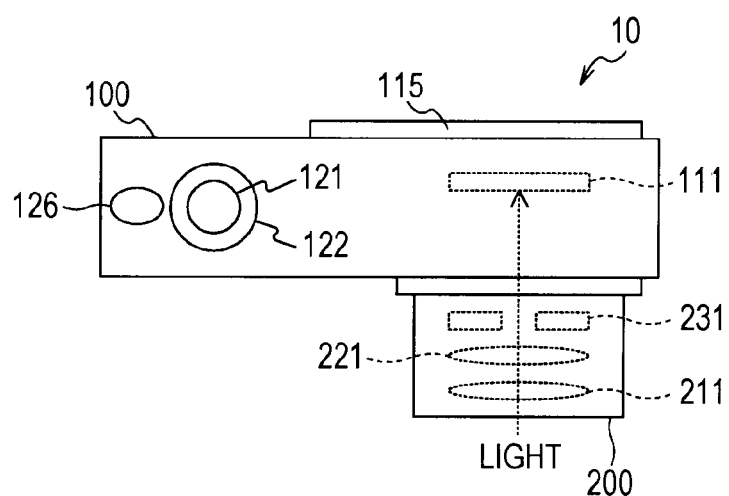

FIGS. 2A to 2C illustrate an exemplary exterior configuration of an imaging system 10 in accordance with a first embodiment of the present invention. FIG. 2A is a front view illustrating the exterior of an imaging system 10. FIG. 2B is a rear view illustrating the exterior of an imaging system 10. FIG. 2C is a top view illustrating the exterior of an imaging system 10.

An imaging apparatus 100 is provided with a flash emitter 102, an imaging element 111, a display unit 115, a shutter button 121, a mode dial 122, a directional button 123, an OK button 124, a cancel button 125, and a power switch 126. Also, an interchangeable lens 200 is provided with a zoom lens 211, a focus lens 221, and an aperture 231. Herein, the shutter button 121, the mode dial 122, the directional button 123, the OK button 124, the cancel button 125, and the power switch 126 correspond to the user interface 120 illustrated in FIG. 1. Also, since the imaging element 111, the display unit 115, the zoom lens 211, the focus lens 221, and the aperture 231 correspond to the respective like-named components illustrated in FIG. 1, detailed description thereof is herein reduced or omitted. Meanwhile, since the zoom lens 211, the focus lens 221, and the aperture 231 are built into the interchangeable lens 200, and since the imaging element 111 is built into the imaging apparatus 100, these components are illustrated with broken lines in FIG. 2C.

By way of example, FIGS. 2A to 2C illustrate an imaging system 10 wherein user-operable members such as the directional button 123 and the OK button 124 provided on the exterior of the imaging apparatus 100 are used to conduct operations for selecting an image, button, etc. displayed by the display unit 115 (button press operations, for example).

The flash emitter 102 illuminates a subject with light rays and increases light from the subject (reflected light) on the basis of control by the controller 130 (illustrated in FIG. 1). Thus, imaging in conditions of low ambient illumination is made possible.

The shutter button 121 is a user-operable member for conducting a shutter operation, and is subjected to full-press or half-press operations by the user. For example, in the case where the shutter button 121 is half-pressed, optimal focus control for imaging is conducted. Also, in the case where the shutter button 121 is fully pressed, optimal focus control for imaging is conducted, and picture data at the time of the full press is recorded onto the recording device 116.

The mode dial 122 is a dial for setting respective modes. For example, modes such as a regular AF mode, a continuous AF mode, and a picture display mode for displaying pictures recorded onto the recording device 116 may be set by operations of the mode dial 122.

The directional button 123 is an operable button used in the case of selecting an item such as a button or picture displayed by the display unit 115. The currently selected item moves up, down, left, or right according to the pressed portion of the directional button 123.

The OK button 124 is used in the case of confirming the selected state of respective items displayed by the display unit 115. The cancel button 125 is used to cancel this confirmation in the case where the selected state of respective items displayed by the display unit 115 has been confirmed. The power switch 126 switches the power of the imaging apparatus 100 on and off.

Also, a zoom operation is manually conducted by the user in the imaging system 10. This zoom operation is conducted in a state where, for example, the user's hand is gripping a given portion of the interchangeable lens 200. For example, if a zoom operation is manually conducted by the user, zoom functions are controlled according to the manual operation, and a subject included in an imaged picture can be enlarged or reduced.

[Exemplary Functional Configuration of Imaging Apparatus]

Figure 3:
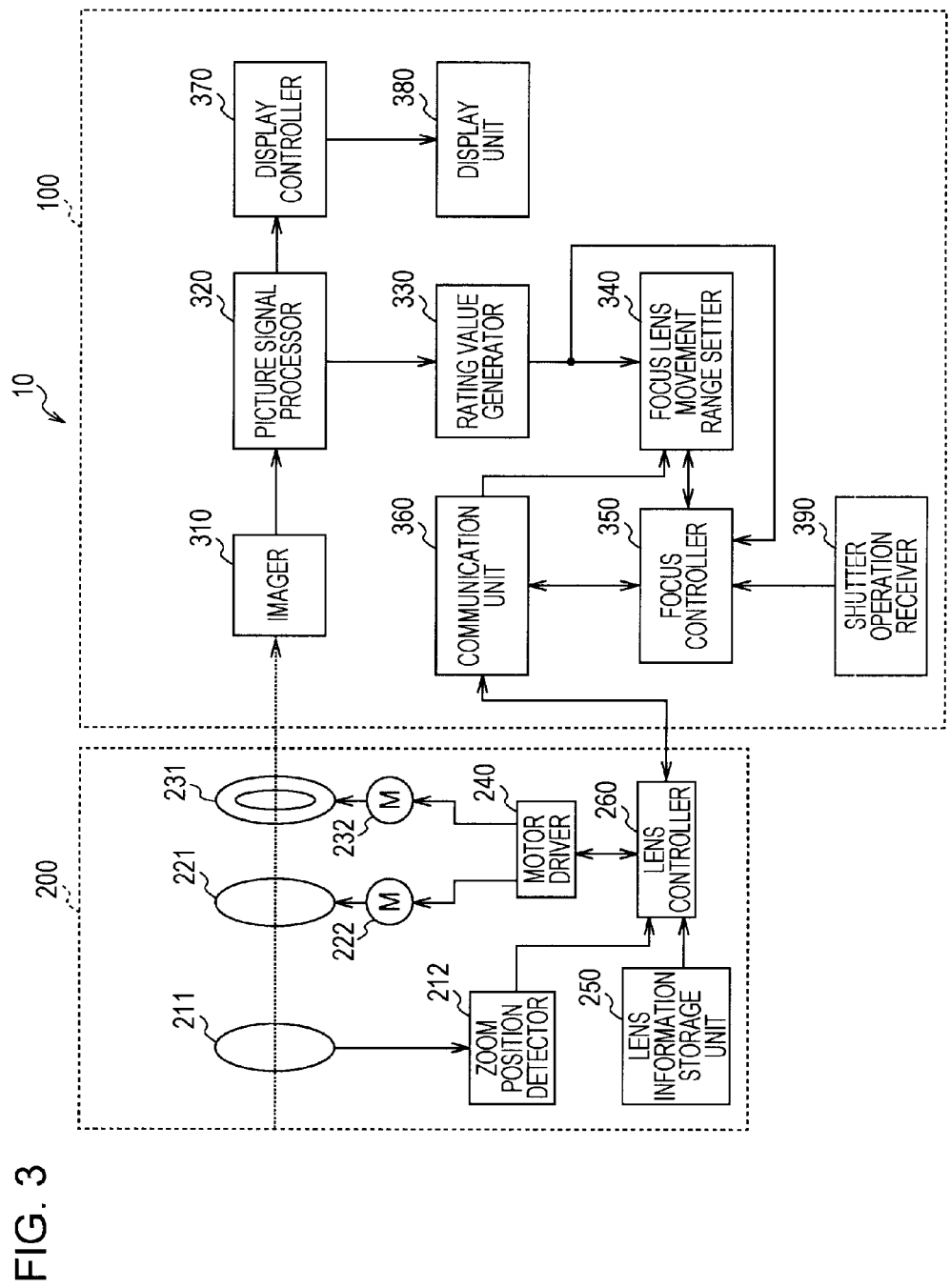
FIG. 3 is a block diagram illustrating an exemplary functional configuration of an imaging apparatus in accordance with a first embodiment of the present invention.

FIG. 3 is a block diagram illustrating an exemplary functional configuration of an imaging apparatus 100 in accordance with a first embodiment of the present invention. In FIG. 3, a functional configuration of the imaging apparatus 100 is illustrated together with an internal configuration of the interchangeable lens 200 illustrated in FIG. 1 in order to facilitate explanation.

The imaging apparatus 100 is provided with an imager 310, a picture signal processor 320, a rating value generator 330, a focus lens movement range setter 340, and a focus controller 350. The imaging apparatus 100 is also provided with a communication unit 360, a display controller 370, a display unit 380, and a shutter operation receiver 390. Herein, the imager 310 corresponds to the imaging element 111, the analog signal processor 112, and the A/D converter 113 illustrated in FIG. 1, for example. The picture signal processor 320 corresponds to the DSP 114 illustrated in FIG. 1, for example. The rating value generator 330, the focus lens movement range setter 340, the focus controller 350, and the communication unit 360 correspond to the controller 130 illustrated in FIG. 1, for example. The display controller 370 corresponds to the DSP 114 illustrated in FIG. 1, for example. The display unit 380 corresponds to the display unit 115 illustrated in FIG. 1, for example. The shutter operation receiver 390 corresponds to the user interface 120 illustrated in FIG. 1, for example.

The imager 310 generates an imaged picture (picture signal) by converting incident light from a subject that is incident via the focus lens 221, and supplies the generated picture signal (electrical signal) to the picture signal processor 320. Herein, in FIG. 3, the illustration and explanation of a functional configuration related to a recording process for recording an imaged picture (picture data) generated by the imager 310 is reduced or omitted.

The picture signal processor 320 performs various signal processing on a picture signal output from the imager 310 and outputs the signal-processed picture signal to the rating value generator 330 and the display controller 370.

The rating value generator 330 generates an AF rating value (contrast signal) from a picture signal output from the picture signal processor 320, and outputs the generated AF rating value to the focus lens movement range setter 340 and the focus controller 350. In other words, the rating value generator 330 extracts high-frequency components in the spatial frequency of a picture in a specific region (AF region) included in an imaged picture corresponding to a picture signal output from the picture signal processor 320. Then, the rating value generator 330 generates a luminous intensity difference (AF rating value) for the extracted high-frequency components. In this way, an in-focus position is detected on the basis of a generated AF rating value.

The focus lens movement range setter 340 sets a focus lens movement range for the focus controller 350 to conduct focus control, and outputs the set focus lens movement range to the focus controller 350. More specifically, the focus lens movement range setter 340 acquires information used when setting a focus lens movement range (lens information such as the imaging magnification) from the interchangeable lens 200 via the communication unit 360. Then, the focus lens movement range setter 340 sets a focus lens movement range on the basis of the acquired information, an AF rating value output from the rating value generator 330, and information related to focus control from the focus controller 350.

For example, the imaging magnification corresponding to the position of the focus lens 221 (a position where it is presumed that a target subject is in focus) may be taken as a basis. In this case, the focus lens movement range set by the focus lens movement range setter 340 is a range of positions of the focus lens 221 corresponding to imaging magnifications for which the rate of change in the imaging magnification from the basis lies within a fixed range. For example, from among the positions of the focus lens 221 corresponding to imaging magnifications whose rates of change lie within a fixed range, the focus lens movement range setter 340 may specify the position lying the farthest distance away at close-up from the position of the focus lens 221 according to the basis. The focus lens movement range setter 340 also specifies a position lying the farthest distance away at infinity. The focus lens movement range setter 340 is then able to take the range specified by these two positions as the focus lens movement range. In other words, the focus lens movement range setter 340 takes the imaging magnification corresponding to the position of the focus lens 221 as a basis, and sets a focus lens movement range on the basis of the rate of change in the imaging magnification from this basis.

Herein, in the case where the focus lens movement range setter 340 calculates a subject's movement velocity with respect to the optical axis direction and the calculated movement velocity is small relative to a fixed value, the focus lens movement range setter 340 sets a focus lens movement range based on that imaging magnification. Also, when a live preview picture is being displayed by the display unit 380 in the case where a continuous AF mode is set, the focus lens movement range setter 340 sets a focus lens movement range based on that imaging magnification.

At this point, it is also anticipated that the set focus lens movement range may not satisfy the range expected for focus control by the focus controller 350 (AF minimum range). In this case, the focus lens movement range setter 340 newly sets that minimum AF range as the focus lens movement range.

The focus lens movement range setter 340 also calculates a focus lens movement range on the basis of the focal depth corresponding to the position of the focus lens 221 according to the basis. The focus lens movement range setter 340 then compares the calculated focus lens movement range based on the focal depth to the focus lens movement range based on the imaging magnification. From the results of this comparison, the focus lens movement range setter 340 is able to select the focus lens movement range with the narrower range, and set the selected focus lens movement range. Herein, the focus lens movement range setter 340 is an example of a setting unit and a calculating unit.

The focus controller 350 conducts communication control with the interchangeable lens 200, and conducts focus control on the basis of respective information acquired by this communication via the communication unit 360 and an AF rating value output from the rating value generator 330. In other words, the focus controller 350 conducts focus control by moving the focus lens 221 in a focus lens movement range set by the focus lens movement range setter 340. Herein, the focus controller 350 conducts focus control when a half-press operation or full-press operation of the shutter button 121 is conducted, for example.

The communication unit 360 communicates with the lens controller 260 on the basis of control by the focus controller 350. For example, the communication unit 360 may conduct synchronous communication with the lens controller 260 on the basis of control by the focus controller 350. Herein, the communication unit 360 is an example of a second communication unit.

The display controller 370 causes imaged pictures that have been picture signal-processed by the picture signal processor 320 to be successively displayed by the display unit 380 as live preview pictures. The display controller 370 may cause live preview pictures to be successively displayed by the display unit 380 while in an imaging standby state when a still picture imaging mode is set, for example.

The display unit 380 displays an imaged picture supplied from the display controller 370 as a live preview picture.

The shutter operation receiver 390 receives a press operation of the shutter button 121 conducted by the user, and outputs the received operation content to the focus controller 350. More specifically, optimal focus control is conducted by the focus controller 350 in the case where a half-press operation or full-press operation of the shutter button 121 is conducted. Also, in the case where a full-press operation of the shutter button 121 is conducted, the focus control is conducted, and an imaged picture generated by the imager 310 at the time of the full-press operation is recorded onto the recording device 116 (illustrated in FIG. 1).

[Exemplary Focus Lens Transitions when Continuous AF Mode is Set]

Figure 4A:
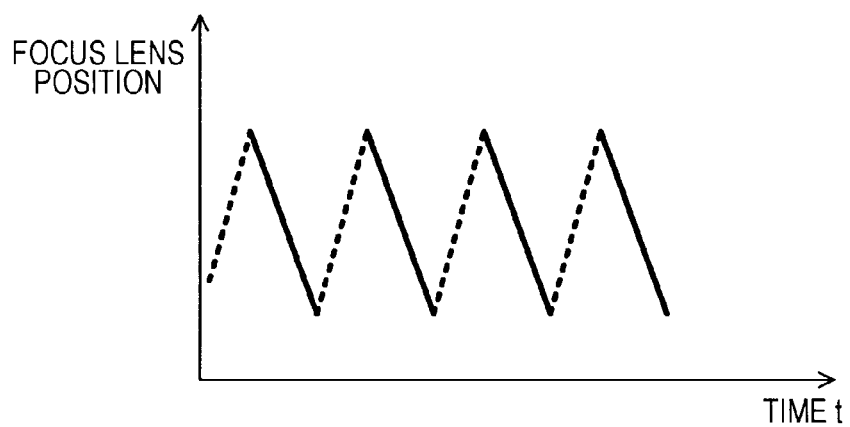
FIGS. 4A and 4B illustrate exemplary transitions of a focus lens in the case where a continuous AF mode is set in an imaging apparatus in accordance with a first embodiment of the present invention.
Figure 4B:
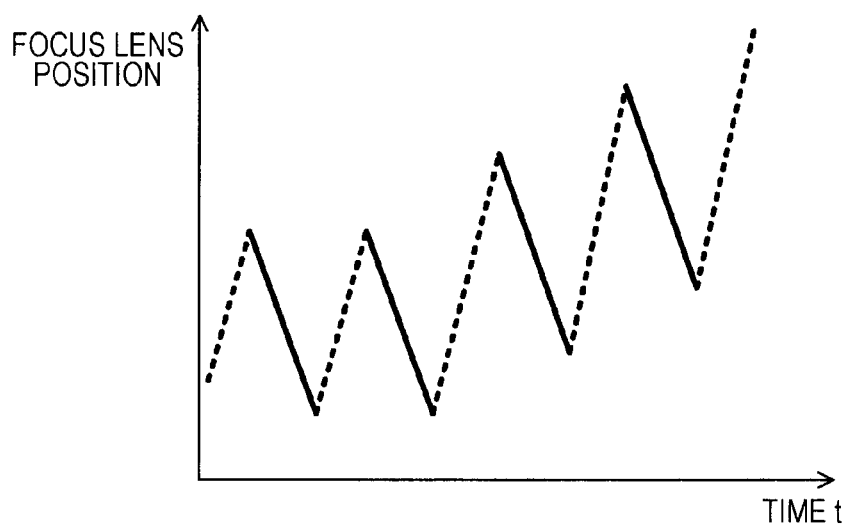

FIGS. 4A and 4B illustrate exemplary transitions of a focus lens 221 in the case where a continuous AF mode is set in an imaging apparatus 100 in accordance with a first embodiment of the present invention. FIG. 4A illustrates exemplary transitions of the focus lens 221 in the case where the distance between the imaging apparatus 100 and a subject (subject distance) is approximately constant. FIG. 4B illustrates exemplary transitions of the focus lens 221 in the case where the subject distance varies.

In FIGS. 4A and 4B herein, exemplary transitions of the focus lens 221 are illustrated wherein the vertical axis is taken to be an axis representing the position of the focus lens 221 (position in the optical axis direction), and the horizontal axis is taken to be a time axis. Also, in FIGS. 4A and 4B, transitions of the focus lens 221 when acquiring an AF rating value are indicated by solid lines, while transitions of the focus lens 221 when moving to the start point of an AF process are indicated by broken lines.

Properties of contrast AF will now be described. Contrast AF is a method that extracts high-frequency components in the spatial frequency in a specific region (AF region) included in an imaged picture, and detects an in-focus position on the basis of a luminous intensity difference in the high-frequency components (AF rating value). In other words, a focused imaged picture can be generated by moving a focus lens to a position that maximizes the luminous intensity difference in the extracted high-frequency components.

Also, by using contrast AF in an imaging system 10, the number of component parts can be reduced, and reduced size and lowered cost can be realized. Herein, in an imaging system with an interchangeable lens, it is anticipated that AF precision may worsen due to error in the flange back length when combining an interchangeable lens and an imaging apparatus 100 (main camera unit). However, such worsening of AF precision due to error in the flange back length can be suppressed by using contrast AF.

Next, consider the case where an AF process is conducted on a moving subject in an imaging apparatus that uses contrast AF. In an imaging apparatus that uses contrast AF, a focus lens should be moved within a given range (focus lens movement range) centered about the position of a subject (target subject). For example, in the case where the subject distance is approximately constant, an AF process can be conducted by keeping the range in which to the move the focus lens (focus lens movement range) approximately constant, as illustrated in FIG. 4A.

However, with an AF process with respect to a moving subject (continuous AF), the maximum value of the luminous intensity difference (AF rating value) that indicates the varying position of the subject should be continually tracked. For this reason, the focus lens should be continually moved while a half-press operation is being conducted on the shutter button. For example, in the case where the subject distance varies, the subject moves in the optical axis direction, and thus an AF process should be conducted while varying the focus lens movement range to match this movement, as illustrated in FIG. 4B.

Herein, in the case of setting a focus lens movement range, it is preferable to set a focus lens movement range with respect to a moving subject such that the subject can be reliably acquired while taking into account detection error in the subject's movement velocity. Meanwhile, in the case where a subject is still, it is conceivable that the focus lens may not be moved.

However, with contrast AF, there is a danger in that response may become extremely poor if the focus lens is completely stopped, since the focus lens is moved forward and backward and an AF process is conducted when the shutter button is fully pressed. Also, it is anticipated that accurately predicting the movement velocity of moving bodies would be difficult. Thus, it is preferable to keep conducting an AF process in a given focus lens movement range, even in the case where a subject's velocity is undetermined.

Visibility of a live preview picture displayed by the display unit 380 will now be described. As described earlier, it is preferable to move a focus lens in a given focus lens movement range, even in the case where a subject's velocity is undetermined. However, when the focus lens is moved, the imaging magnification is changed according to the movement of the focus lens. For this reason, a live preview picture displayed by the display unit 380 is enlarged or reduced according to this change.

For example, in the case where enlargement or reduction of a live preview picture displayed by the display unit 380 is minute, the live preview picture is little affected. However, in the case where the rate of change in the imaging magnification is comparatively large, enlargement or reduction of the live preview picture increases, and there is a danger that the live preview picture may become difficult to view when the user confirms a subject. Thus, in a first embodiment of the present invention, a focus lens movement range is set on the basis of the imaging magnification in the case where fixed conditions are satisfied. In so doing, visibility of a live preview picture displayed by a display unit 380 is improved, and the discomfort of extended viewing is decreased.

[Exemplary Relationship Between Focus Lens Position and AF Rating Value at that Position]

Figure 5A:
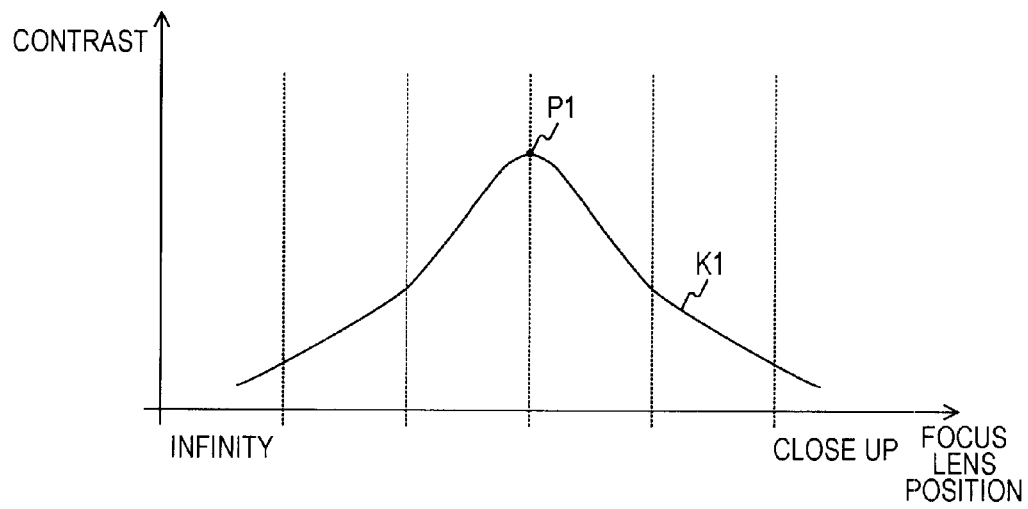
FIGS. 5A and 5B illustrate an exemplary relationship between the position of a focus lens and an AF rating value (contrast) calculated at this position in accordance with a first embodiment of the present invention.
Figure 5B:
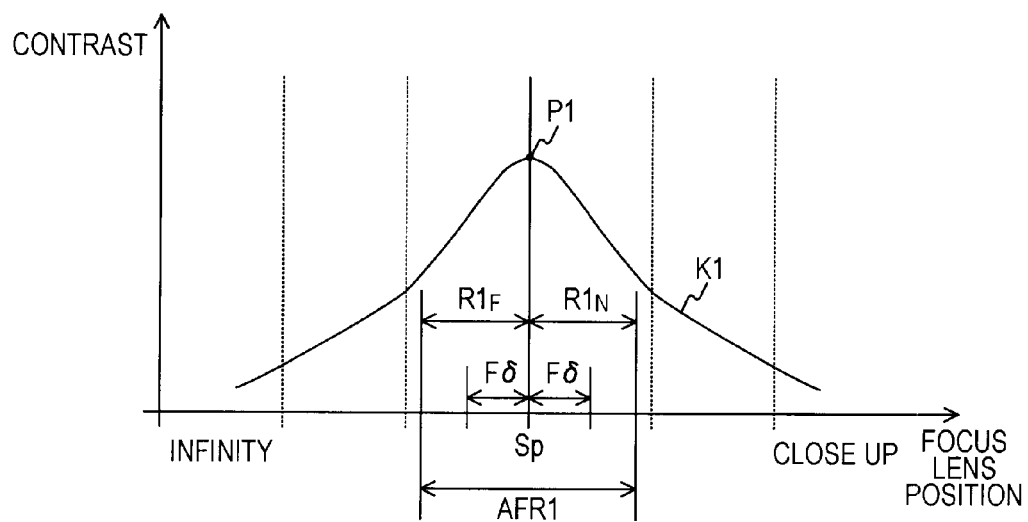

FIGS. 5A and 5B illustrate an exemplary relationship between the position of a focus lens 221 and an AF rating value (contrast) calculated at this position in a first embodiment of the present invention. In FIGS. 5A and 5B, the vertical axis is taken to be an axis representing the AF rating value (contrast), and the horizontal axis is taken to be an axis representing the position of the focus lens 221. For example, in the case where an in-focus subject exists, the AF rating value corresponding to the position of the focus lens 221 traces a curve K1, as illustrated in FIG. 5A.

In the example illustrated in FIG. 5A, the peak position P1 on the curve K1 is the position where the contrast value for an imaged picture generated by the rating value generator 330 is at maximum. In other words, the peak position P1 is the in-focus position (perfect focus).

An AF process will now be described. An AF process is conducted when a half-press operation or a full-press operation of the shutter button 121 is conducted. In this AF process, a single operation (one cycle of the AF process) is repeated. This single operation is a combination of a broken line (moving to a position where contrast information acquisition is started) and a solid line (contrast information acquisition operation) illustrated in FIGS. 4A and 4B, for example. It is possible to acquire the distance from the lens to a subject (subject distance) every time a cycle of the AF process is executed. In other words, the following Eq. 1 is obtained.

$$(1/a)+(1/b)=1/f \tag{1}$$

Herein a is the subject distance, b is the distance from the lens to a figure formed on the imaging element 111, and f is the focal length of the lens.

According to Eq. 1, the subject distance $a=1/((1/f)-(1/b))$ can be computed. Also, change in the subject distance can be acquired by repeating the AF process. A subject's velocity (velocity in the optical axis direction) can be calculated on the basis of the change in the subject distance (distance change information) acquired in this way (subject velocity prediction process). More specifically, a subject's velocity at respective times (subject velocity V) can be computed according to the following Eq. 2.

$$V=DC1/t \tag{2}$$

Herein, DC1 is the subject distance variation (i.e., the magnitude of subject movement), and t is the time interval between when subject distances were acquired.

In other words, the subject velocity V can be calculated by dividing the subject distance variation DC1 by the time interval between when subject distances were acquired. Herein, the AF process is repeatedly conducted while the shutter button 121 is half-pressed.

FIG. 5B illustrates an example of a range in which to move a focus lens 221 in an AF process (focus lens movement range AFR1). The focus lens movement range AFR1 is a focus lens movement range calculated on the basis of the focal depth $\phi$.

Herein, an AF process using the focus lens movement range AFR1 is conducted in the case where a subject velocity V has not been calculated, the case where the subject velocity V is less than a threshold value thV, or the case where subject acquisition did not fail in the previous AF process. In other words, in the case where a continuous AF mode is set, an AF process using the focus lens movement range AFR1 is conducted in the case where fixed conditions are satisfied (i.e., the case where the subject velocity is slow or the case where the subject has stopped). Herein, the threshold value thV may be taken to be a value on the order of the velocity at which a person walks, for example. A value from 0.5 m/s to 1.0 m/s may be used as the threshold value thV, for example.

For example, in the case where a narrow focus lens movement range is set compared to the previous cycle, it is anticipated that subject acquisition may fail in an AF process conducted using this focus lens movement range. For this reason, it is preferable to conduct an AF process while enlarging the focus lens movement range in the case where subject acquisition failed in the previous cycle of an AF process. For example, in the case where the result of the previous cycle of the AF process was low contrast, the entire range over which the focus lens can move at that time may be taken as the focus lens movement range. Meanwhile, in the case where contrast was at a peak at the close-up position, a range extending just a given magnitude from the edge point towards close-up may be taken as the focus lens movement range for the current cycle. Also, in the case where contrast was at a peak at the infinity edge, a range extending just a given magnitude from the edge point towards close-up may be taken as the focus lens movement range for the current cycle. In this case, the extension magnitude may be a fixed magnitude. Alternatively, the ratio of contrast information in the low-frequency region versus contrast information in the high-frequency region may be used, and a magnitude adjusted according to this ratio, etc. may be taken as the extension magnitude.

A focus lens movement range AFR1 calculation method will now be described.

First, when an AF process is initiated, a focus controller 350 communicates with a lens controller 260 of a interchangeable lens 200 via a communication unit 360. By this communication, a focus lens movement range setter 340 and the focus controller 350 acquire lens information stored in a lens information storage unit 250. Herein, the lens information stored in the lens information storage unit 250 includes the position of the focus lens 221 (position where a subject is focused), the focal length, aperture value (f-number), and the imaging magnification. However, the imaging magnification varies according to factors such as the focal length f and the position of the focus lens 221. For this reason, imaging magnifications according to states of the respective optical members (the position of the focus lens 221, etc.) are associated with the respective states, and stored in the lens information storage unit 250 as lens information.

Meanwhile, on the basis of lens information such as the focal length f and the position of the focus lens 221 acquired from the motor driver 240, the lens controller 260 acquires an imaging magnification corresponding to the respective lens information from the lens information storage unit 250. The lens controller 260 then transmits the acquired lens information (including the imaging magnification) to the focus lens movement range setter 340 and the focus controller 350 via the 360 communication unit 360.

Subsequently, the focus lens movement range setter 340 calculates the lens focal depth $\phi$ on the basis of the acquired lens information. Herein, the lens focal depth $\phi$ is calculated using the following Eq. 3.

$$\phi = F \times \delta \quad (3)$$

Herein, F is the aperture value (f-number), and $\delta$ is a value expressing the permissible circle of confusion of the imaging element 111.

Subsequently, the focus lens movement range setter 340 calculates a focus lens movement range AFR1 on the basis of the calculated focal depth $\phi$. This focus lens movement range AFR1 is calculated on the basis of the calculated focal depth $\phi$ and a coefficient assumed to be sufficient for acquiring a moving subject with contrast AF. More specifically, the focus lens movement range setter 340 calculates a close-up movement range $R1_N$ and an infinity movement range $R1_F$ using the following Eqs. 4 and 5. Herein, the close-up movement range $R1_N$ and the infinity movement range $R1_F$ are ranges respectively set at close-up and infinity, with the position where the subject is assumed to exist being taken as a basis.

$$R1_N = K_N \times \phi \quad (4)$$

$$R1_F = K_F \times \phi \quad (5)$$

Herein, the close-up coefficient $K_N$ and the infinity coefficient $K_F$ are coefficients assumed to be sufficient for acquiring a moving subject with contrast AF. For example, values within a range from 1 to 20 may be used as the close-up coefficient $K_N$ and the infinity coefficient $K_F$. Furthermore, the same value may be taken for the close-up coefficient $K_N$ and the infinity coefficient $K_F$, or respectively different values may be taken. Also, the close-up coefficient $K_N$ and the infinity coefficient $K_F$ are for example stored as built-in values by the imaging apparatus 100 (stored in the memory (ROM) 140, for example).

The focus lens movement range setter 340 calculates a focus lens movement range AFR1 by using a close-up movement range $R1_N$ and an infinity movement range $R1_F$ calculated in this way. More specifically, a focus lens movement range AFR1 is computed according to the following Eq. 6.

$$Sp + R1_N > AFR1 > Sp - R1_F \quad (6)$$

Herein, Sp represents the position (position of the focus lens 221) assumed to be in focus with a target subject. Herein, in the first embodiment of the present invention, the position of the focus lens 221 is taken to approach close-up as the value of Sp increases.

[Exemplary Relationship Between Focus Lens Position and Imaging Magnification]

Figure 6A:
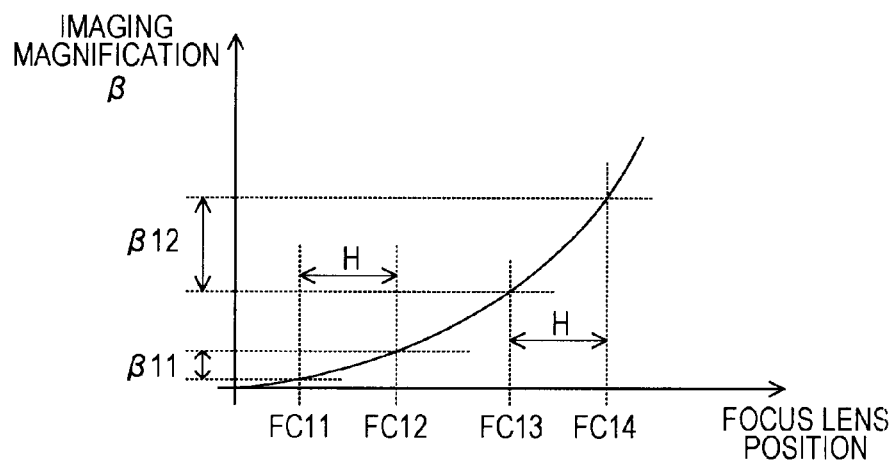
FIGS. 6A and 6B illustrate an exemplary relationship between the position of a focus lens and an imaging magnification corresponding to this position in accordance with a first embodiment of the present invention.
Figure 6B:
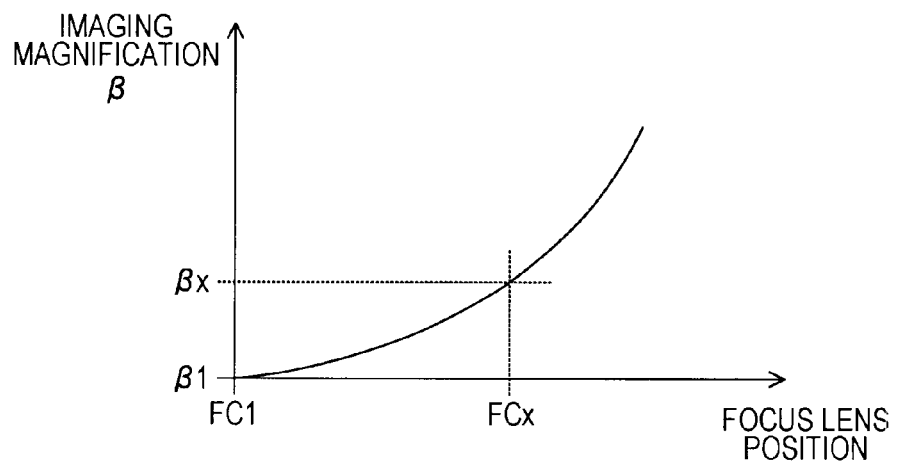

FIGS. 6A and 6B illustrate an exemplary relationship between the position of a focus lens 221 and an imaging magnification corresponding to this position in a first embodiment of the present invention. In FIGS. 6A and 6B, the vertical axis is taken to be an axis representing the imaging magnification ($\beta$), and the horizontal axis is taken to be an axis representing the position of the focus lens 221. Herein, the origin represents the position (position of the focus lens 221) assumed to be in focus with a target subject, and the imaging magnification corresponding to that position. Furthermore, with the horizontal axis illustrated in FIGS. 6A and 6B, movement in the arrow direction from the origin is taken to mean movement towards close-up.

As illustrated in FIG. 6A, the imaging magnification varies according to movement of the focus lens 221. For example, $\beta 11$ is taken to be the variation in the imaging magnification in the case where the position of the focus lens 221 changes from FC11 to FC12, and $\beta 12$ is taken to be the variation in the imaging magnification in the case where the position of the focus lens 221 changes from FC13 to FC14. Herein, the variation from FC11 to FC12 and the variation from FC13 to FC14 are taken to be the same (a variation H). In this case, the imaging magnification variation $\beta 12$ corresponding to the change in the position from FC13 to FC14 is larger than the imaging magnification variation $\beta 11$ corresponding to the change in the position from FC11 to FC12, as illustrated in FIG. 6A. In other words, as the movement distance of the focus lens 221 increases, the imaging magnification variation corresponding to that amount of movement also increases. Also, if the imaging magnification with respect to an amount of movement of the focus lens 221 changes, the imaging magnification of an imaged picture generated by the imager 310 is changed accordingly. In other words, if the imaging magnification variation corresponding to an amount of movement of the focus lens 221 increases, then the variation in the imaging magnification of an imaged picture generated by the imager 310 also increases. If the imaging magnification variation increases in this way, then the variation in the magnification of a live preview picture displayed by the display unit 380 during imaging standby will also increase, and it is anticipated that the live preview picture may become difficult to view. In this case, it may become difficult for the user to confirm a subject included in an imaged picture displayed by the display unit 380 during imaging standby, and there is a danger that the user may feel uncomfortable.

Thus, the focus lens movement range AFR1 calculated in the example illustrated in FIG. 5B may be comparatively large, for example. In this case, the imaging magnification variation also increases, and thus it is preferable to constrain the focus lens movement range so as to suppress variation in the imaging magnification. In so doing, it becomes easy for the user to confirm a subject included in an imaged picture displayed by the display unit 380 during imaging standby, and the user's ease of viewing can be improved.

Thus, in a first embodiment of the present invention, a focus lens movement range AFR2 is calculated on the basis of the imaging magnification. The calculated focus lens movement range AFR2 is then compared to the focus lens movement range AFR1, and a focus lens movement range AFR is determined on the basis of the comparison result. In other words, the focus lens movement range AFR2 and the focus lens movement range AFR1 are compared, and as a result the narrower range is set as the focus lens movement range AFR.

Hereinafter, a method for calculating a focus lens movement range AFR2 used in this way will be described with reference to FIG. 6B.

Take β1 to be the imaging magnification at a position FC1 of the focus lens 221, and βx to be the imaging magnification at a position FCx of the focus lens 221. The rate of change in the imaging magnification in this case can be computed according to the following Eq. 7.

$$RC1=|β1-βx|/β1 \qquad (7)$$

Herein, the imaging magnifications β1 and βx are transmitted from the lens controller 260 in response to a transmission request from the focus controller 350.

Also, a minimum βx that satisfies the following Eq. 8 is computed by monotonically increasing or monotonically decreasing the position, starting from the position FC1.

$$RC1<Thb \qquad (8)$$

Herein, Thb is a threshold value uniquely prescribed irrespective of lens, which may take a value from 0.1 to 2.0(%), for example. In other words, since error is anticipated in the computation of the rate of change RC1, it is preferable for the threshold value Thb to take a comparatively small value.

Also, $Mag_{lim}$ is taken to be a movement range based on the imaging magnification in the case where FCx is taken to be the position of the focus lens 221 corresponding to βx computed according to Eq. 8. This movement range $Mag_{lim}$ can be computed using the following Eq. 9.

$$Mag_{lim}=|FC1-FCx| \qquad (9)$$

Also, take $R2_N=Mag_{limN}$ (a movement range based on imaging magnification towards close-up) and $R2_F=Mag_{limF}$ (a movement range based on imaging magnification towards infinity). In this case, a focus lens movement range AFR2 can be computed according to the following Eq. 10.

$$Sp+R2_N>AFR2>Sp-R2_F \qquad (10)$$

In this way, the focus lens movement range setter 340 calculates a focus lens movement range AFR2 on the basis of imaging magnification.

Herein, the movement range $Mag_{lim}$ differs at close-up and infinity. For this reason, rather than calculating a focus lens movement range AFR2 using respective movement ranges $Mag_{lim}$ at close-up and infinity as expressed in Eq. 10, just the greater of the close-up and infinity values may be used as a representative value. In other words, the greater of respective movement ranges $Mag_{lim}$ at close-up and infinity is taken to be a representative value RF1, and this representative value RF1 may be used to calculate a focus lens movement range AFR2 (Sp+RF1>AFR2>Sp−RF1).

Also, in cases where a comparatively large focus lens movement range is preferred, such as in low-light conditions, $R2_N=R1_N$ and $R2_N=R1_N$ may be taken as true to prevent poorer tracking performance in an AF process.

Subsequently, the focus lens movement range setter 340 compares the calculated focus lens movement ranges AFR1 and AFR2, and sets a focus lens movement range on the basis of the comparison result. In other words, the focus lens movement range setter 340 compares the calculated focus lens movement ranges AFR1 and AFR2, and as a result sets the narrower range as the focus lens movement range. Although the example herein illustrates setting a focus lens movement range according to a comparison between AFR1 and AFR2, separate comparisons may be made at close-up and infinity, respectively, and the respectively narrower ranges at close-up and infinity may be selected on the basis of the comparison results.

Herein, in the case where AFR2 is determined as the focus lens movement range, it is anticipated that a minimum movement range (AF minimum range) $R_{min}$ for executing contrast AF may not be satisfied. With contrast AF, since changes in contrast become extremely mild near the in-focus state, it can be difficult to determine if a picture is in-focus or a low-contrast subject. Thus, in order to facilitate such determinations, a focus lens should be moved only by minimum movement ranges $R_{minN}$ and $R_{minF}$. For this reason, in the case where $R2_N$ is less than $R_{minN}$, or in the case where $R2_F$ is less than $R_{minF}$, the following Eq. 11 is used to compute and set a focus lens movement range AFR3 (AF minimum range safeguard process).

$$Sp+R_{minN}>AFR3>Ap-R_{minF} \qquad (11)$$

Herein, minimum movement ranges $R_{minN}$ and $R_{minF}$ are for example stored as built-in values by the imaging apparatus 100 (stored in the memory (ROM) 140, for example).

At this point, since a focus lens movement range can be respectively set at close-up and at infinity, the focus lens movement range AFR4 expressed in the following Eq. 12 may also be set, for example.

$$Sp+R_{minN}>AFR4>Ap-R2_F \qquad (12)$$

Although the foregoing illustrates an example of respectively using close-up and infinity cases to set a focus lens movement range, a representative value may also be used to set a focus lens movement range without separating into close-up and infinity cases. For example, for a movement range R1 based on focal depth, the wider of the close-up movement range $R1_N$ and the infinity movement range $R1_F$ may be selected. Also, for a movement range R2 based on imaging magnification, the narrower of the close-up movement range $R2_N$ and the infinity movement range $R2_F$ may be selected. Additionally, for a minimum movement range R, the wider of the close-up movement range $R_{minN}$ and the infinity movement range $R_{minF}$ may be selected. The respective ranges selected in this way (a movement range R1 based on focal depth, a movement range R2 based on imaging magnification, and a minimum movement range R) may then be used as representative values for the focus lens movement range setter 340 to set a focus lens movement range.

An AF process is conducted by moving a focus lens 221 within a focus lens movement range set in this way. In other words, the focus controller 350 outputs to the lens controller 260 via the communication unit 360 a control signal that moves the focus lens 221 within a focus lens movement range set by the focus lens movement range setter 340. In so doing, the focus controller 350 conducts focus control.

[Exemplary Focus Lens Transitions when Continuous AF Mode is Set]

Figure 7A:
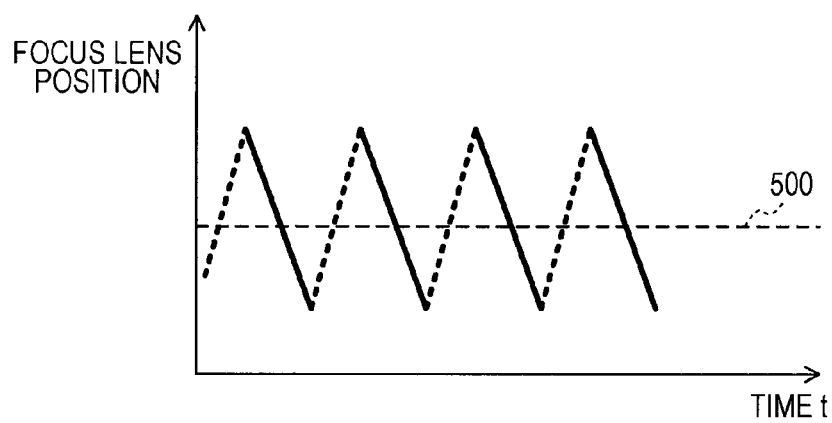
FIGS. 7A and 7B illustrate exemplary transitions of a focus lens in the case where a continuous AF mode is set in an imaging apparatus in accordance with a first embodiment of the present invention.
Figure 7B:
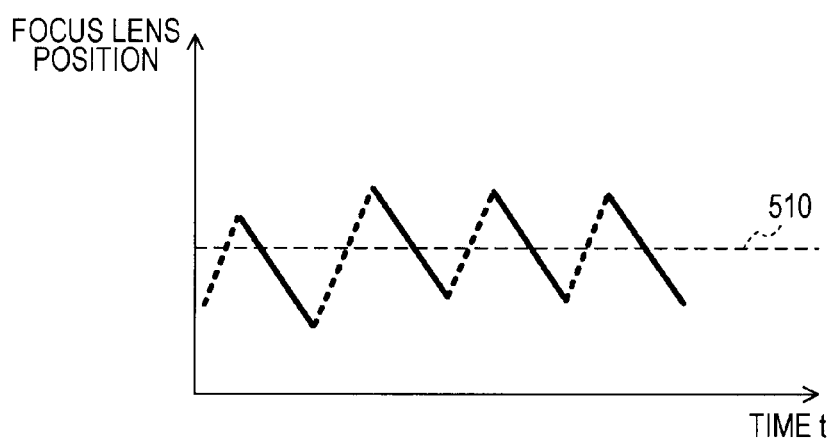

FIGS. 7A and 7B illustrate exemplary transitions of a focus lens 221 in the case where a continuous AF mode is set in an imaging apparatus 100 in accordance with a first embodiment of the present invention. FIGS. 7A and 7B illustrate exemplary transitions of a focus lens 221 in the case where the distance between the imaging apparatus 100 and a subject (subject distance) is approximately constant. Also, the broken horizontal lines 500 and 510 represent the position of the focus lens 221 assumed to be in focus with a target subject. Herein, the relationship between the vertical axis and the horizontal axis as well as the relationship between solid lines and broken lines is similar to the example illustrated in FIGS. 4A and 4B, and thus description thereof is herein reduced or omitted.

FIG. 7A illustrates exemplary transitions of the focus lens 221 in the case where a focus lens movement range AFR1 (a focus lens movement range based on focal depth) has been set by the focus lens movement range setter 340. FIG. 7B illustrates exemplary transitions of the focus lens 221 in the case where a focus lens movement range AFR2 (a focus lens movement range based on imaging magnification) has been set by the focus lens movement range setter 340.

As illustrated in FIG. 7B, the amount of movement of the focus lens 221 can be decreased in the case where a focus lens movement range AFR2 is set by the focus lens movement range setter 340. In this way, in the case of executing autofocus that prioritizes subject tracking performance, the focus lens movement range is constrained by the rate of change in imaging magnification when it is determined that the subject is not moving. In so doing, subject composition and angle of view become easier to confirm, and visibility can be improved during imaging operations.

Also, constraint of the focus lens movement range can be realized by providing a system that transmits lens information including the imaging magnification from the interchangeable lens 200 to the imaging apparatus 100. For this reason, such constraint can also be applied to other interchangeable lenses provided with functions for communicating with the main imaging apparatus.

[Exemplary Operation of Imaging Apparatus 100]

Operation of an imaging apparatus 100 in accordance with a first embodiment of the present invention will now be described with reference to the drawings.

Figure 8:
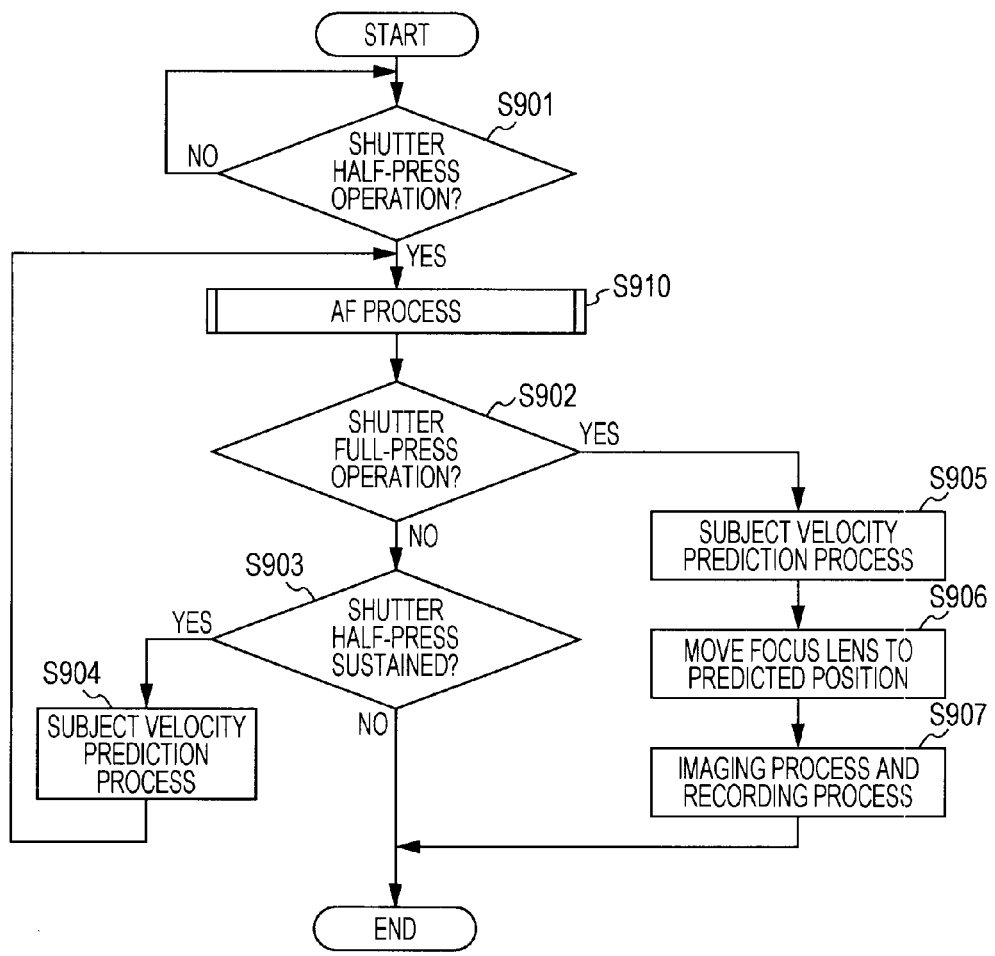
FIG. 8 is a flowchart illustrating exemplary processing operations in an imaged picture recording process executed by an imaging apparatus in accordance with a first embodiment of the present invention.

FIG. 8 is a flowchart illustrating exemplary processing operations in an imaged picture recording process executed by an imaging apparatus 100 in accordance with a first embodiment of the present invention. This example describes the case of a live preview picture being displayed by a display unit 380 in an imaging standby state when a continuous AF mode is set.

First, it is determined whether or not a half-press operation of the shutter button 121 has been conducted (step S901). Monitoring is continued in the case where a half-press operation has not been conducted. Meanwhile, in the case where a half-press operation of the shutter button 121 has been conducted (step S901), an AF process is conducted (step 910). This AF process is for example a single operation (one cycle of the AF process) that combines a broken line (moving to a position where contrast information acquisition is started) and a solid line (contrast information acquisition operation) illustrated in FIGS. 4A and 4B, for example. The AF process will be described in detail and with reference to FIG. 9.

Subsequently, it is determined whether or not a full-press operation on the shutter button 121 has been conducted (step S902). In the case where a full-press operation has not been conducted, it is determined whether or not a half-press operation of the shutter button 121 is being continually conducted (step S903). In the case where a half-press operation of the shutter button 121 is being continually conducted (step S903), a subject velocity prediction process is conducted (step S904), and the process returns to step S910. In other words, the AF process is repeatedly conducted (steps S910 and S902 to S904) while the shutter button 121 is half-pressed.

Also, in the case where a full-press operation of the shutter button 121 has been conducted (step S902), a subject velocity prediction process is conducted, and the distance moved by the subject in a time equivalent to the release lag (subject movement distance) is calculated (step S905). Subsequently, a predicted position (target position) of the focus lens 221 is calculated on the basis of the calculated subject movement distance, and the focus lens 221 is moved to the predicted position thus calculated (step S906). More specifically, a predicted position PF1 of the focus lens 221 is calculated using the following Eq. 13.

$$PF1 = CP1 + MD1 \qquad (13)$$

Herein, CP1 represents the current subject position (corresponding position of the focus lens 221), and MD1 represents the subject movement distance (corresponding movement distance of the focus lens 221).

After the focus lens 221 is moved to the predicted focus position PF1 calculated in this way (step S906), an imaging process and recording process for an imaged picture are conducted (step S907).

In this way, by conducting an imaging process and a recording process for an imaged picture after moving the focus lens 221 to a predicted position PF1, the focus precision can be increased in an imaged picture to be recorded, and thus a more suitable imaged picture can be recorded.

Herein, FIG. 8 illustrates an example of confirming the presence or absence of a firm press operation of the shutter button 121 each time the AF process (step S910) ends. However, the presence or absence of a firm press operation of the focus lens 221 may be continuously monitored such that when a firm press is conducted, the AF process is ended at the time of the firm press and the respective processing operations in steps S905 to S907 are conducted. In so doing, extremely fast imaging response can be realized.

Figure 9:
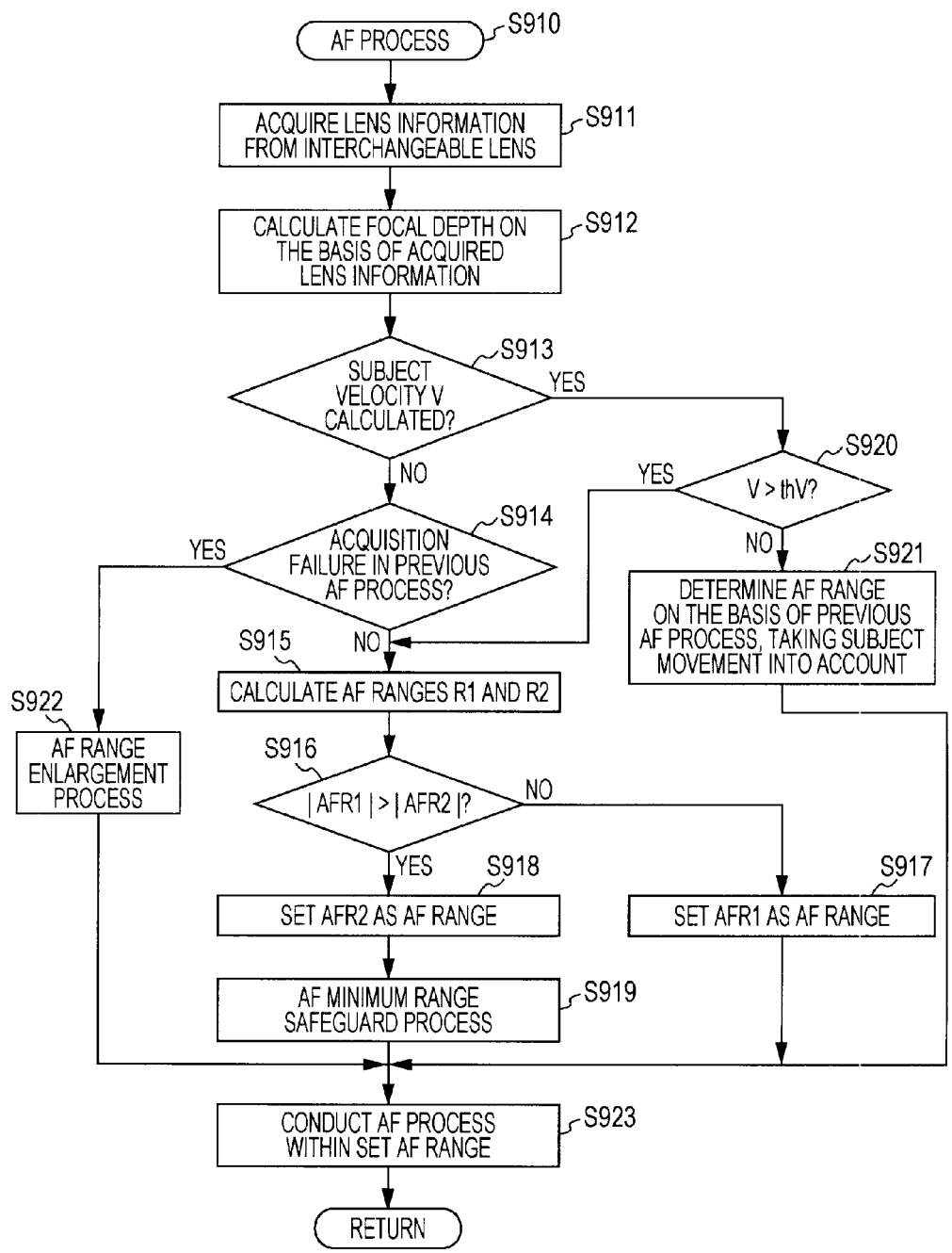
FIG. 9 is a flowchart illustrating an exemplary AF process from among processing operations in an imaged picture recording process executed by an imaging apparatus in accordance with a first embodiment of the present invention.

FIG. 9 is a flowchart illustrating an exemplary AF process (the processing operation in step S910 illustrated in FIG. 8) from among processing operations in an imaged picture recording process executed by an imaging apparatus 100 in accordance with a first embodiment of the present invention. In this processing sequence, the flow up to setting a focus lens movement range and executing AF operation in the AF process is illustrated.

First, when the AF process is initiated, the focus lens movement range setter 340 acquires lens information being stored in the lens information storage unit 250 (step S911).

Subsequently, the focus lens movement range setter 340 calculates the lens focal depth on the basis of the acquired lens information (step S912). Herein, the lens focal depth $\phi$ is calculated using Eq. 3.

Subsequently, it is determined whether or not a subject velocity V has been calculated (step S913). In other words, it is determined whether or not a number of cycles of the AF process have been executed such that calculation of the subject's movement velocity is possible.

In the case where a subject velocity V has not been calculated (step S913), it is determined whether or not subject acquisition failed in the previous cycle of the AF process (step S914). For example, in the case where a comparatively narrow focus lens movement range was set in the previous cycle, it is anticipated that subject acquisition may fail in an AF process conducted using that focus lens movement range. In the case where subject acquisition failed in the previous cycle of the AF process (step S914), an enlargement process for enlarging the focus lens movement range is conducted (step S922), and the process proceeds to step S923. For example, as described earlier, in the case where the result of the previous cycle of the AF process was low contrast, the entire range over which the focus lens can move at that time may be taken as the focus lens movement range. Meanwhile, in the case where contrast was at a peak at the close-up edge position, a range extending just a given magnitude from the edge point towards close-up may be taken as the focus lens movement range for the current cycle. Also, in the case where contrast was at a peak at the infinity edge position, a range extending just a given magnitude from the edge point towards close-up may be taken as the focus lens movement range for the current cycle.

Also, in the case where subject acquisition has not failed in the previous cycle of the AF process (step S914), the focus lens movement range setter 340 calculates focus lens movement ranges AFR1 and AFR2 (step S915). Herein, the focus lens movement range AFR1 is a focus lens movement range calculated on the basis of focal depth. The focus lens movement range AFR2 is a focus lens movement range calculated on the basis of imaging magnification.

Subsequently, the focus lens movement range setter 340 compares the calculated focus lens movement ranges AFR1 and AFR2 (step S916). In the case where the comparison result is such that AFR2 is equal to or greater than AFR1 (step S916), the focus lens movement range setter 340 sets the focus lens movement range AFR1 (step S917).

Meanwhile, in the case where AFR1 is greater than AFR2 (step S916), the focus lens movement range setter 340 sets the focus lens movement range AFR2 (step S918). In the case where AFR2 is determined as the focus lens movement range (AF range) in this way, the focus lens movement range setter 340 conducts an AF minimum range safeguard process (step S919). In other words, in the case where the focus lens movement range AFR2 does not satisfy a minimum movement range $R_{min}$, a focus lens movement range AFR3 is set (step S919). Herein, steps S915, S916, and S918 are an example of setting operations.

Also, by plurally repeating the AF process and recording the subject position and acquisition time thereof, a subject is acquired a minimum of two times. In so doing, a subject velocity V is calculated. In the case where a subject velocity V has been calculated (step S913), it is determined whether or not the subject velocity V is less than a threshold value thV (step S920). Herein, in the case where the subject velocity V is extremely small with respect to the focal depth (step S920), it is possible to narrow the focus lens movement range considerably. For this reason, the process proceeds to step S915.

Meanwhile, in the case where the subject velocity V is equal to or greater than the threshold value thV (step S920), a focus lens movement range enabling subject acquisition is set (step S921). For example, in the case where the AF process is repeated, the subject velocity V computed in step S904 may be used to set the next focus lens movement range, with consideration for the differential subject movement (see Japanese Unexamined Patent Application Publication No. 2010-8695, for example).

By moving the focus lens 221 within a focus lens movement range set in this way, an AF process is conducted (step S923), and operation of the AF process is terminated. Herein, step S923 is an example of a focus control step.

2. Second Embodiment

In a first embodiment of the present invention, an example of setting a focus lens movement range on the basis of imaging magnification when fixed conditions are satisfied was illustrated for an imaging system 10 wherein a removable, interchangeable lens 200 is attached to an imaging apparatus 100. However, a first embodiment of the present invention may also be applied to an imaging apparatus such as a digital still camera with an integrated lens, for example. Thus, in a second embodiment of the present invention, an example of setting a focus lens movement range on the basis of imaging magnification when fixed conditions are satisfied will be described for an imaging apparatus with an integrated lens. Herein, the configuration of an imaging apparatus in accordance with a second embodiment of the present invention is mostly similar to the examples illustrated in FIGS. 1 to 3. For this reason, like reference numbers are given to parts shared in common with a first embodiment of the present invention, and a portion of the description thereof (exterior configuration, functional configuration, etc.) may be reduced or omitted.

[Exemplary Internal Configuration of Imaging Apparatus]

Figure 10:
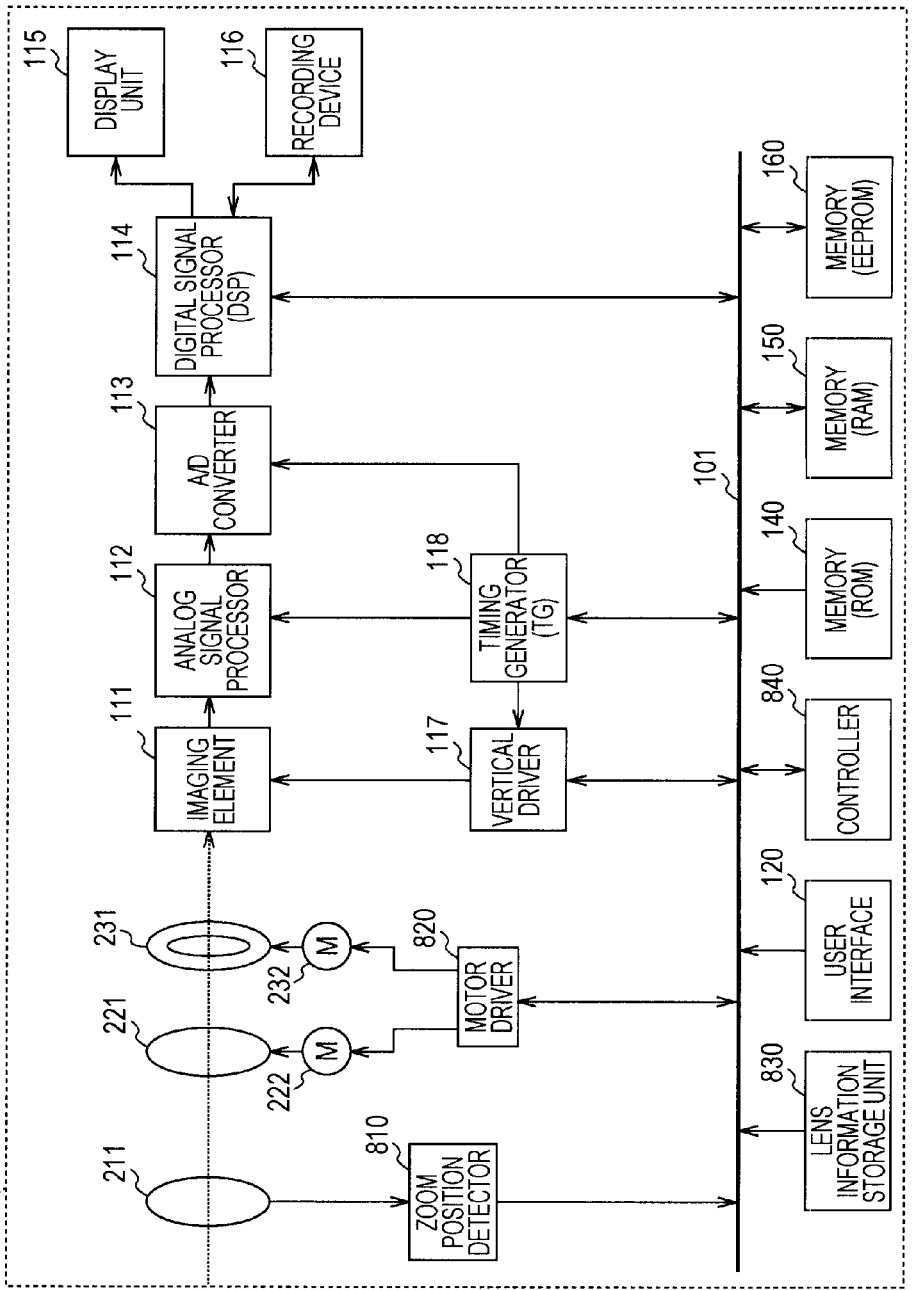
FIG. 10 is a block diagram illustrating an exemplary internal configuration of an imaging apparatus in accordance with a second embodiment of the present invention.

FIG. 10 is a block diagram illustrating an exemplary internal configuration of an imaging apparatus 800 in accordance with a second embodiment of the present invention. The imaging apparatus 800 is provided with a zoom position detector 810, a motor driver 820, a lens information storage unit 830, and a controller 840. Herein, the zoom position detector 810, motor driver 820, lens information storage unit 830, and controller 840 are coupled in a mutually communicable manner via a system bus 101.

The zoom position detector 810 detects the position of a zoom lens 211 driven by zoom operations performed by the user, and outputs a detection result to the controller 840. Herein, the zoom position detector 810 corresponds to the zoom position detector 212 illustrated in FIG. 1.

A focus lens drive motor 222 moves the focus lens 221 on the basis of control by the motor driver 820. An aperture drive motor 232 drives an aperture 231 on the basis of control by the motor driver 820.

The motor driver 820 drives the focus lens drive motor 222 and the aperture drive motor 232 on the basis of control by the controller 840. Herein, the motor driver 820 corresponds to the motor driver 240 illustrated in FIG. 1.

The lens information storage unit 830 is memory that stores characteristic information related to the respective optical members (focus lens 221, aperture 231, etc.) constituting the optics, and supplies stored information to the controller 840. Herein, the lens information storage unit 830 corresponds to the lens information storage unit 250 illustrated in FIG. 1. Also, characteristic information may also be stored in other memory (such as the memory (ROM) 140).

The controller 840 controls respective components of the imaging apparatus imaging apparatus 800 (including the respective optical members constituting the optics). Herein, the controller 840 corresponds to the controller 130 and the lens controller 260 illustrated in FIG. 1.

In this way, a first embodiment of the present invention can be applied to an imaging apparatus with an integrated lens in addition to an imaging apparatus with an interchangeable lens. For this reason, improvements in continuous AF can be broadly implemented.

Also, as indicated earlier, according to an embodiment of the present invention, an AF range can be optimally set when configuring a continuous AF mode. In this case, angle of view adjustments and composition adjustments desired by the user are facilitated while sufficiently maintaining subject tracking performance, and discomfort imparted to the user during imaging can be reduced.

Also, since the focus lens movement range can be narrowed extremely in the case where a subject has stopped, subject movement determination can be further increased in speed. In this way, according to an embodiment of the present invention, suitable focus control can be conducted while maintaining visibility during imaging operations.

It should be appreciated that embodiments of the present invention herein illustrate examples for realizing the present invention. As demonstrated in embodiments of the present invention, the matters in embodiments of the present invention have a respective correspondence with the matters for defining the claimed invention. Similarly, the matters for defining the claimed invention have a respective correspondence with similarly-named matters in embodiments of the present invention. However, it should be appreciated that the present invention is not limited to such embodiments, and that the present invention may be realized by performing various modifications without departing from the scope and spirit of the present invention.

Furthermore, the processing operations described in embodiments of the present invention may be understood as a method having these series of operations, as a program for causing a computer to execute these series of operations, or as a recording medium storing such a program. The medium used as the recording medium may be a Compact Disc (CD), MiniDisc (MD), Digital Versatile Disc (DVD), memory card, or Blu-ray Disc®, for example.

The present application contains subject matter related to that disclosed in Japanese Priority Patent Application JP 2010-122167 filed in the Japan Patent Office on May 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imager configured to generate an imaged picture by converting incident light from a subject that is incident via a focus lens;
    a setting unit configured to set a range of focus lens positions, as a first movement range for the focus lens, corresponding to imaging magnifications for which rate of change in the imaging magnification lies within a fixed range, wherein the fixed range is based on an imaging magnification corresponding to an in-focus position of the focus lens; and
    a focus controller configured to conduct focus control with respect to the subject by moving the focus lens in the set first movement range.

2. The imaging apparatus according to claim 1, wherein the setting unit is configured to:
    calculate a second movement range for the focus lens based on a focal depth corresponding to the in-focus position of the focus lens;
    select the narrower range between the first movement range and the second movement range; and
    set the selected movement range as a focus lens movement range.

3. The imaging apparatus according to claim 1, wherein the setting unit is configured to set the first movement range specified by two positions from the range of focus lens positions corresponding to the imaging magnifications for which the rate of change in the imaging magnification lies within the fixed range, wherein one position of the two positions is a position lying farthest distance away at close-up from the in-focus position of the focus lens and wherein other position of the two positions is a position lying the farthest distance away at infinity.

4. The imaging apparatus according to claim 1, wherein the setting unit is configured to set a predefined range for focus control conducted by the focus controller as a focus lens movement range in a case where the set first movement range does not satisfy the predefined range for focus control.

5. The imaging apparatus according to claim 1, further comprising:
    a calculating unit configured to calculate a movement velocity of the subject with respect to the optical axis, wherein
    the setting unit is configured to set the first movement range in a case where the calculated movement velocity is small relative to a fixed value.

6. The imaging apparatus according to claim 1, further comprising:
    a communication unit configured to communicate with an interchangeable lens and store the imaging magnifications corresponding to respective states of a plurality of optical members, wherein
    the setting unit is configured to acquire the stored imaging magnifications when setting the first movement range for the interchangeable lens.

7. The imaging apparatus according to claim 1, further comprising:
    a display controller configured to successively display the generated imaged picture on a display unit, wherein
    the setting unit is configured to set the first movement range in a case where the generated imaged picture is being displayed on the display unit when a continuous Auto Focus (AF) mode is set.

8. An imaging system comprising:
    an interchangeable lens that comprises:
        a plurality of optical members,
        a first communication unit configured to communicate with an imaging apparatus, and
        a storage unit configured to store imaging magnifications corresponding to respective states of the plurality of optical members; and
    the imaging apparatus comprises:
        a second communication unit configured to communicate with the interchangeable lens,
        an imager configured to generate an imaged picture by converting incident light from a subject that is incident via a focus lens,
        a setting unit configured to acquire an imaging magnification from the stored imaging magnifications in accordance with an in-focus position of the focus lens and set a range of focus lens positions, as a movement range for the focus lens, corresponding to the stored imaging magnifications for which rate of change in the imaging magnification lies within a fixed range, wherein the fixed range is based on the acquired imaging magnification corresponding to the in-focus position of the focus lens, and
        a focus controller configured to conduct focus control with respect to the subject by moving the focus lens in the set movement range.

9. An imaging apparatus control method, comprising:
    setting a range of focus lens positions, as a movement range for a focus lens, corresponding to imaging magnifications for which rate of change in the imaging magnification lies within a fixed range, wherein the fixed range is based on an imaging magnification corresponding to an in-focus position of the focus lens that supplies incident light from a subject to an imager that generates an imaged picture; and
    conducting focus control with respect to the subject by moving the focus lens in the set movement range.

10. A non-transitory computer-readable storage medium having stored thereon, a computer program having at least one code section executable by a computer, thereby causing the computer to execute steps of:
    setting a range of focus lens positions, as a movement range for a focus lens, corresponding to imaging magnifications for which rate of change in the imaging magnification lies within a fixed range, wherein the fixed range is based on an imaging magnification corresponding to an in-focus position of the focus lens that supplies incident light from a subject to an imager that generates an imaged picture; and conducting focus control with respect to the subject by moving the focus lens in the set movement range.

\* \* \* \* \*